United States Patent [19]

Thomerson

[11] 4,338,046

[45] Jul. 6, 1982

[54] BUMPER RING WITH RELIEF GROOVE

[75] Inventor: Clarence Thomerson, Navarro, Tex.

[73] Assignee: Regal International, Inc., Corsicana, Tex.

[21] Appl. No.: 117,712

[22] Filed: Feb. 19, 1980

[51] Int. Cl.³ .................... E02B 3/22; E02B 17/00; B63H 21/04

[52] U.S. Cl. .................... 405/212; 114/219; 267/140; 267/153; 405/213; 405/215

[58] Field of Search ............... 114/219, 220; 405/212, 405/213, 215, 216, 211, 214; 267/139–141, 152, 153, 140.5, 141.2–141.7, 57.1 R; 248/615, 616

[56] References Cited

U.S. PATENT DOCUMENTS

| 2,952,979 | 9/1960 | Rolando | 114/220 X |
| 3,285,594 | 11/1966 | Belle | 267/141 X |
| 3,311,081 | 3/1967 | Parker | 114/220 |
| 3,572,677 | 3/1971 | Damon | 267/57.1 R |
| 3,873,076 | 3/1975 | Evans | 114/219 X |

Primary Examiner—Sherman D. Basinger
Attorney, Agent, or Firm—John F. Booth; Gerald G. Crutsinger; Monty L. Ross

[57] ABSTRACT

A shock absorbing bumper system assembly (10) is provided for attachment to an offshore structure (12). Assembly (10) utilizes a vertical column (34) supported from arms (20, 22). An outer protector (38) surrounds the column (34) and is eccentrically positioned relative to the column (34). A pair of resilient ring elements (42, 44) are positioned in an axially spaced relationship, bonded to the column (36), and conform to the annular shape formed between protector (38) and column (36). Resilient connectors (30, 32) may also be used and comprise rings (54), which are similar in construction to the resilient ring elements (42, 44).

8 Claims, 4 Drawing Figures

BUMPER RING WITH RELIEF GROOVE

CROSS-REFERENCE TO RELATED APPLICATIONS

This application is related to application Ser. No. 020,163, filed Mar. 13, 1979, entitled SHOCK ABSORBING COLUMN, now U.S. Pat. No. 4,273,473, issued June 16, 1981, and to application Ser. No. 054,443, filed July 3, 1979, entitled OFFSHORE BUMPER SYSTEM AND METHOD OF MANUFACTURING, now U.S. Pat. No. 4,311,412, all the material disclosed in these applications being incorporated herein by reference.

TECHNICAL FIELD

The present invention relates to a bumper ring with a relief groove used in bumper systems to protect offshore structures from damage caused by contact with vessels, such as boats, barges and the like.

BACKGROUND OF THE INVENTION

In the exploration and development of offshore petroleum reserves, it is sometimes necessary to erect platforms located miles off shore. These platforms form a base on which drilling, exploration and storage activities can occur and the majority of these platforms have legs or other types of support structure extending down into the water. To transport men and material to and from these platforms, vessels are used and docked along side during unloading operations. Although small vessels are sometimes used in these operations, normally the vessels are quite large. When contact occurs between these vessels and the platform leg, damage can occur to either the structure or the vessel.

To protect these platforms from damage due to contact by vessels operating near the platforms, systems attached to the platform adjacent the water level have been designed and operate to fend off vessels and absorb shocks caused when the vessels come into contact with the platform legs.

One system, which has been used for years in the industry, is known as the Lawrence Allison System. This system utilizes a vertically standing piece of pipe or other structural member supported from the platform at the water level. The pipe typically has its upper end supported from the leg of the platform at a position above the high tide level and its lower end connected to the platform at a position below the low tide level. This system further utilizes a plurality of rubber vehicle tires with the pipe exiting through the center of the tires to form a tire stack to absorb the vessel's shocks. Some of these systems leave the outer surfaces of tires exposed and some have a cylindrical metal skin or can supported around the outside of the tires and spaced away from the central pipe by the tires. In the latter systems, the tires resiliently separate the outer contact skin from the inner central support.

In some other prior art systems, the outer can or contact surface is resiliently separated from the central structural support by a pre-formed rubber element. In one such system, the outer protective shield or can and the central support are coaxially positioned by using a solid rubber element which extends the length of the outer shield and occupies less than 360° but at least 180° of the annular space formed between the outer shield and the central support. In these systems, the rubber element has a constant radial thickness and are positioned in the annular space on the side from which contact with the approaching vessels normally occurs.

Although prior art bumper systems have performed satisfactorily, in many ways unappreciated by the industry, their design has contained aspects which are redundant and which add to the overall cost of the system. For example, these prior art systems fail to appreciate and/or accommodate the savings in design cost and size reductions which are accomplished by taking into account the limited direction from which contact forces are applied. Further, these prior art systems utilize complicated manufacturing and fabrication techniques which are unnecessary.

DISCLOSURE OF THE INVENTION

A shock absorbing system for protecting an offshore member against excessive shock is disclosed. This system uses a vertical support column supported from its upper and lower ends. A cylindrical protector is eccentrically positioned around the support column and provides a contact surface for vessels. At least two resilient shock absorbing elements are designed to fit in the annular space formed between the column and the protector. At least a pair of shock absorbing members are positioned in axially spaced locations within the annular surface and each of these shock absorbing members includes a body with a relief groove disposed in opposing faces of the body, the grooves having sufficient size and shape to equalize deformation stresses within the shock absorbing members.

In one embodiment, the support column is connected through rigid connections to horizontally extending arms connected to the platform.

In another embodiment, a resilient joint shock cell, such as that shown in the system disclosed in U.S. Pat. No. 4,005,672 and in U.S. Pat. No. 4,109,474, may be formed between the central support and the horizontally extending arms.

BRIEF DESCRIPTION OF THE DRAWINGS

For a more complete understanding of the present invention and the advantages thereof, reference is now made to the following description taken in conjunction with the accompanying drawings in which like reference numbers are used to designate like parts and.

DETAILED DESCRIPTION OF THE INVENTION

Figure 1:
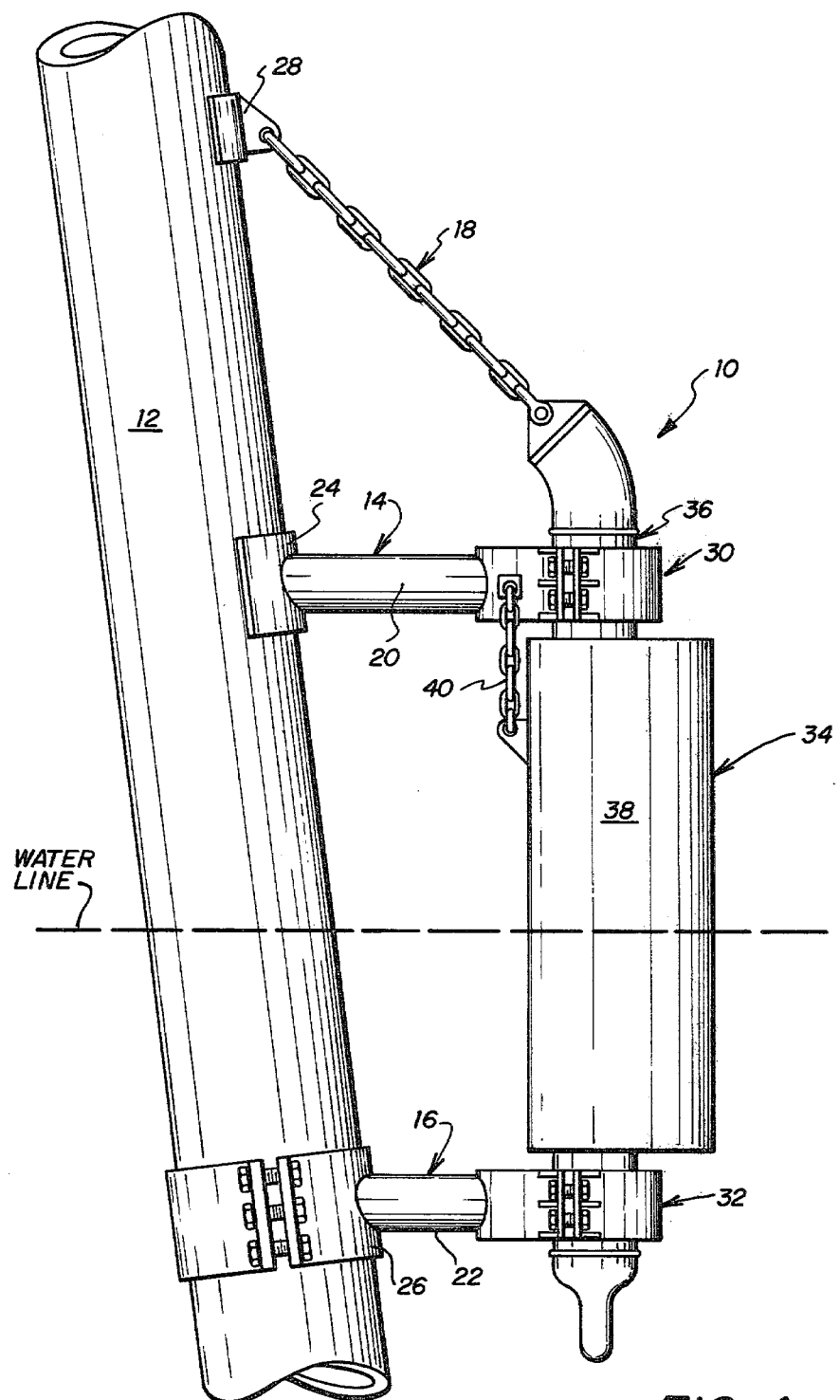
FIG. 1 is a side elevation of a shock absorbing system of the present invention shown attached to a leg of an offshore platform.

The invention can be best understood by referring to the drawings, in which FIG. 1 shows a shock absorbing bumper assembly 10 attached to a vertically extending structural member 12. The structural member 12 can be the leg or other structural portion of an offshore platform, jack up, submersible or semi-submersible rig or the like. It is also envisioned that structural member 12 could represent a portion of a pier or piling of a dock, wharf or the like.

Assembly 10 is shown attached to the structural member 12 at the water level, illustrated by the dotted line in FIG. 1, and is positioned to provide protection for the structural member 12 by fending off boats, barges and other vessels which may, by accident or necessity, come into contact with structural member 12. It is also envisioned that assembly 10 could be utilized to protect fluid carrying conduits, such as stand pipes and the like, from damage due to impact from such vessels.

Upper and lower horizontally extending support assemblies 14 and 16, respectively, and an optional tension member assembly 18 may be used to support assembly 10 from member 12.

Figures 2, 3, 4:
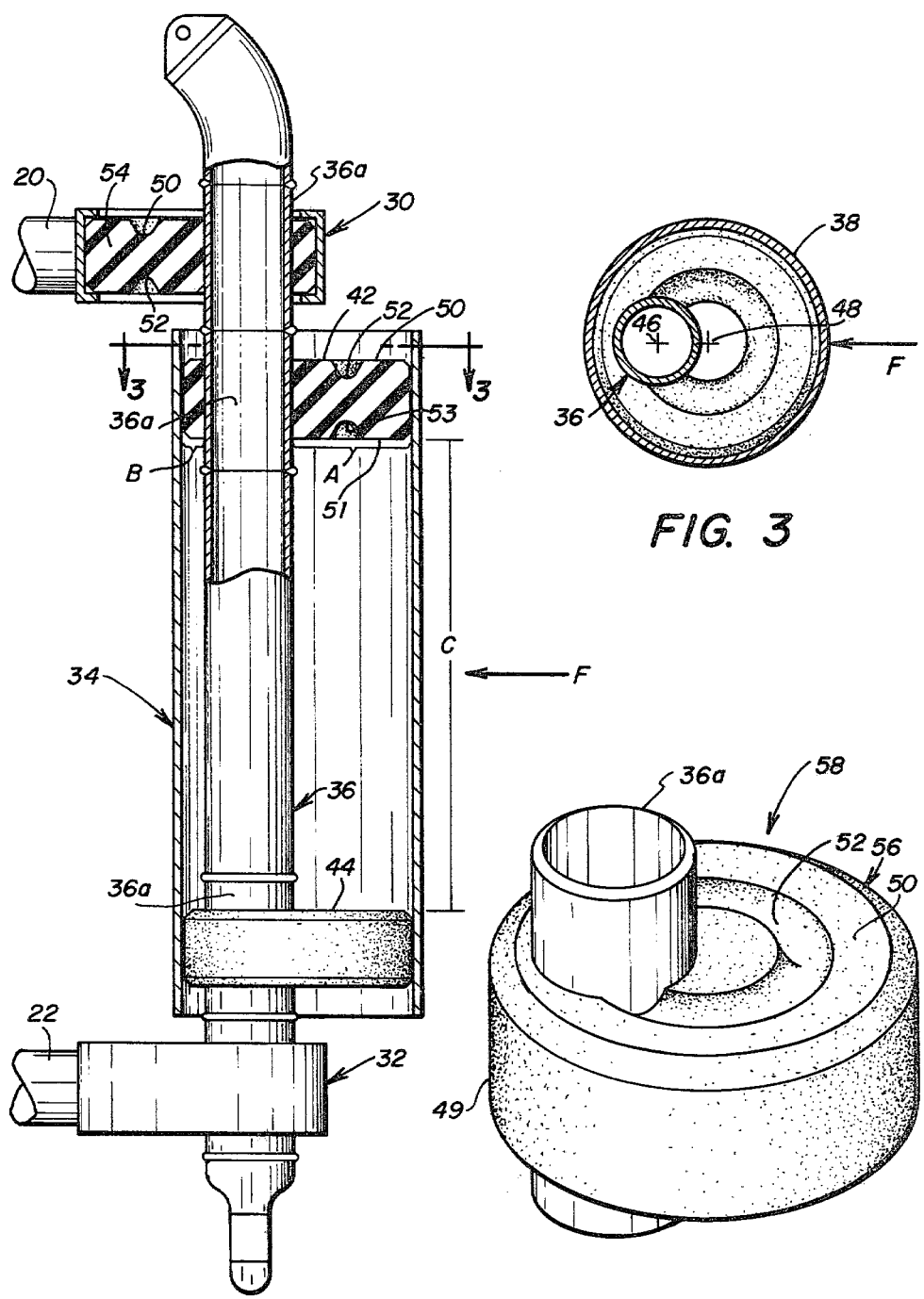
FIG. 2 is a view similar to FIG. 1 showing the shock absorbing system of FIG. 1 partially in section.
FIG. 3 is a sectional view taken across line 3—3 of FIG. 2 looking in the direction of the arrows.
FIG. 4 is a perspective view of a sub-assembly of the shock absorbing system.

As best seen in FIGS. 1 and 2, upper and lower support assemblies 14 and 16 comprise upper and lower generally horizontally extending arms 20 and 22. Upper arm 20 is attached to a piece of hollow structural tubing which acts as a flange that is welded to structural member 12. Lower arm 22 is attached to another piece of hollow structural tubing which forms a flange 26 that is attached to structural member 12 by use of a clamp assembly, as shown. It is envisioned, of course, that arms 20 and 22 could be formed from other materials besides hollow structural tubing such as box beams, I-beams, channels and the like. It is only important that arm 20 and 22 have sufficient structural integrity to support assembly 10 in place and withstand the load supplied by contact between assembly 10 and approaching vessels. Further, it is to be envisioned that either or both of upper and lower arms 20 and 22 could have a shock cell of the type described in U.S. Pat. No. 4,005,672, U.S. Pat. No. 4,109,474, and U.S. patent application Ser. No. 020,163 disposed between the assembly and structural member 12 to provide additional shock absorbing capacity. For simplicity, however, the details of the shock cell and its connection to arms 20 and 22 is not shown, it being understood, of course, that the mounting would be in accordance with the teachings of the above mentioned patents and patent application whose specifications are incorporated herein by reference. Further, it is to be understood that optional tension member 18 may be connected to member 12 at 28 in the manner described in U.S. Pat. No. 4,109,474.

An upper shock absorbing connector assembly 30 is supported at the outer end of arm 20 and a lower shock absorbing connector assembly 32 is supported at the outer end of lower arm 22.

As shown in FIGS. 1 and 2, an assembly 34 against which vehicles contact during use of the bumper system is supported by arms 20 and 22 and is positioned in a vertically extending attitude. This contact assembly 34 comprises a vertically extending support column 36 connected to and spanning between upper and lower shock absorbing connector assemblies 30 and 32. A cylindrical outer protector 38 is positioned to enclose a portion of column 36 and is eccentrically positioned around and spaced from column 36. Outer protector 38 extends vertically through the area in which contact between vessels and the assembly usually occurs and is of sufficient length to accommodate changes in water level such as those due to tides. Outer protector 38 is held in position by a pair of support chains 40 which are positioned on opposite sides of column 36 with one end connected to outer protector 38 and the other end connected to upper connector assembly 30.

As best seen in FIG. 2, outer protector 38 is separated from column 36 by upper and lower shock rings 42 and 44, respectively. Further, it is preferred that outer protector 38 and inner column 36 be cylindrical members with their respective center lines being parallel, but not coaxial so that a maximum thickness, represented by A, and a minimum thickness, represented by B, exists in the annular space between column 36 and outer protector 28.

The arrow identified as F represents the normal direction of force as applied by vessels coming into contact with the system. Upon application of the force, outer protector 38 is displaced in the direction of arrow F, or as shown in FIG. 3 to the left. This displacement increases the size of the annular space between outer protector 38 and column 36 on the side away from arrow F, to the left as shown in FIGS. 2 and 3 and decreases the thickness of the annular space on the side of column 36 nearest arrow F, to the right as shown in FIGS. 2 and 3. Further, upon application of the force, column 36 may be moved in connector assembly 30 and 32 toward arms 20 and 22, respectively, to the left in FIG. 2. Thus, the resilient members, when oriented in this fashion, provide additive shock absorbing characteristics.

As an exemplary embodiment, outer protector 38 is a 30-inch diameter pipe, column 36 is a 10 ¾-inch diameter pipe and the axes of the two parts are separated by a distance of approximately 5⅝ inches. The annular thickness A will be approximately 14 inches while the annular thickness B will be approximately 2¾ inches. Thus, the maximum thickness is approximately 5 times larger than the minimum thickness to absorb the shock from vessels contacting outer protector 38.

Upper and lower shock rings 42 and 44, respectively, are made from resilient material and are shaped as illustrated in FIGS. 2, 3 and 4 so that additional resilient shock absorbing material is positioned on the side of column 36 where the compression loads are normally the highest.

According to a particular feature of the present invention, a unique design is disclosed for the shock ring, which tends to equalize deformation stresses and tends to produce a substantially linear load distribution curve. Since the shock rings are eccentrically positioned, the deformation stresses will tend to be equalized to produce a substantially linear load distribution curve or to approximate a uniform spring rate in the body within a designated deformation range. This desirable result has been obtained by using a body of elastomatic material with an outer periphery 49 of substantially circular cross-section, with upper and lower surfaces 50 and 51, respectively, and with generally "V" shaped upper and lower coincident grooves 52 and 53, respectively, disposed a substantially equal distance away from outer periphery 49 (concentrically of axis 48). It is preferred that grooves 52 and 53 each have a maximum width that is between 30 and 50% of the design deflection and have a combined depth (distance from surface 50 and 51 to the apex of the groove) that is between 30 and 50% of the total thickness of the body. The design deflection is the distance the ring is designed to be deflected during normal operations.

As an exemplary embodiment for the outer protector 38 and column 36 previously described, rings 42 and 44 are designed with a 10 inch design deflection. The body has a diameter of 27.5 inches and each groove has a depth of 2 inches (a combined depth of 4 inches) and a maximum width at the base of the "V" shape of 4 inches. The walls of the grooves are generally "V" shaped with the angle between the walls being approximately 60° or the angle from the coincident axis of the matching grooves to each facing wall being approximately 30°.

It should be noted that rings 42 and 44 are axially spaced a distance shown in FIG. 2 as C. This spacing leaves the outer protector 38 unsupported between the two rings. Contact from the vessel against protector 38 normally occurs in this unsupported space. Since outer protector 38 is of a size and material to permit deflection without plastic deformation, a shock absorbing effect results from such outer protector in addition to the shock absorbing effect of deforming rings 42 and 44.

To further absorb shock, as shown in FIG. 1, connector assemblies 30 and 32 may utilize a shock ring or cylindrical member 54 identical in construction to shock rings 42 and 44. Rings 54 are positioned 180° from the position of rings 42 and 44 so that the maximum thickness of ring 54 is on the platform side of column 36. Thus, the thickest portion of rings 54 is positioned on the platform side of column 36 to provide the maximum compressive shock absorption for the incoming force as illustrated by arrow F.

In operation, a vessel which comes into contact with outer protector 38 will provide shock forces to system 10 in the direction of arrow F. These forces are absorbed in the system by compression of shock cells, if present, compression of rings 54 in upper connector assembly 30 and lower connector assembly 32, compression of upper ring 42 and lower ring 44 and by deflection of bending of outer protector 38.

A method of fabricating the system comprises a particular feature of the present invention such that columns 36 are fabricated in sections. First, a short section of pipe 36a, as shown in FIG. 4, is bonded to the interior of a shock ring 56, similar to that described in relation to rings 42 and 44, to form a shock ring sub-assembly 58. Once a plurality of these shock ring assemblies have been fabricated, they may be connected together by welding and proper orientation of rings 56 as required, such as described in U.S. patent application Ser. No. 054,443, which is incorporated hereby by reference. The method of fabricating the bumper system then includes forming at least two bumper elements with each element made from a cylindrical body of resilient material having a cylindrical opening extending through the body and with a relief groove disposed in opposing faces of the body of sufficient size and shape to equalize deformation stresses to produce a substantially linear load distribution curve. Similarly to the fabrication procedure disclosed in U.S. patent application Ser. No. 054,443, the bumper elements are then connected to the exterior of a structural member 36a, each structural member having an external wall of like size and shape as the opening in the resilient annular bumper element. A support member sub-assembly is then formed by rigidly joining the structural members in a spaced relationship. The sub-assemblies are then inserted into an outer protector and the bumper elements are bonded to the structural members of the outer protector. The ends of the sub-assembly are then connected to support arms which are mounted to the offshore structure.

In summary, the present invention provides an apparatus for attachment to an offshore platform which provides shock absorbing elements having an increased capacity due to the eccentric design which includes means for equalized deformation stresses to produce a substantially linear load distribution curve in the eccentrically disposed shock absorbing elements.

The invention having been described, what is claimed is:

1. A bumper assembly for protecting an offshore member from contact by vessels such as boats and barges, comprising: upper and lower support arms for connection to said offshore member; a vertically extending cylindrical tubular contact member having sufficient length to span an area of contact and an outer surface of engaging approaching vehicles; a support member extending axially through said contact member and supported by said support arms; and a pair of axially spaced ring means resiliently supporting said contact member from said support member for absorbing shocks applied by a vessel engaging said contact member, said axially spaced ring means being positioned on said support member such that the axis of said contact member is radially spaced from and extending parallel to the axis of said support member, with each said shock absorbing ring means including a body with a periphery of circular-cross-section and upper and lower surfaces, upper and lower coincident grooves disposed a substantially equal distance away from the periphery of the body and extending into the body from the upper and lower surfaces by a distance sufficient to approximate a uniform spring rate in the body when a vessel engages said contact member.

2. The assembly of claim 1 wherein each said shock absorbing ring means further includes the body being made from material which is sufficiently resilient to conform to the shape of the annular space between said support and contact members.

3. The assembly of claim 2 wherein each shock absorbing ring means further includes the body having a cylindrical outer surface of a shape corresponding to the interior wall of said contact member and a cylindrical inner surface conforming to the exterior surface of said support member.

4. The assembly of claim 3 wherein the inner surface of each said shock absorbing ring means is bonded onto the exterior of said support member.

5. A method of fabricating a bumper assembly, comprising the steps of: forming at least two resilient annular bumper elements, each element having a resilient body with a cylindrically shaped opening which has a center line extending parallel to and displaced from the center line of the body and with a relief groove disposed in opposing faces of the body and concentrically of the center line of said element, each said relief groove extending into said body a distance sufficient to equalize deformation stresses in said body and thereby provide a substantially uniform spring rate when said body is deformed within a designated range; connecting each of said bumper elements onto the exterior of separate structural members, each structural member having an external wall of like shape and size as the opening in said elements; forming a support member sub-assembly by rigidly joining the structural members in a spaced relationship; inserting the sub-assembly into an outer protector; and connecting support arms to the ends of said sub-assembly.

6. The method of claim 5, wherein said step of connecting comprises bonding said elements to said structural member.

7. A bumper assembly for an offshore structure, comprising: a support arm; a receptacle formed on the end of said arm; a cylindrical shock absorbing element supported in said receptacle having a body of resilient material with an opening which has a center line extending parallel to and displaced from the center line of the body, a relief groove disposed in opposing faces of the body and concentrically of the center line of said cylindrical element, each said relief groove extending into said body a distance sufficient to equalize deformation stresses in said body and thereby provide a substantially uniform spring rate when said body is deformed within a designed range; and a support column extending through the opening through the body of resilient material in the direction transverse to said support arm, the body of resilient material being eccentrically positioned on said support column with more of the material facing in the direction of said support arm.

8. The assembly of claim 7, wherein an annular space of varying thickness in the radial direction is formed between the interior wall of said receptacle and the exterior wall of said support column, wherein the radial thickness of the annular space is a maximum on the side of said support column adjacent to the connection of said arm to said receptacle, and wherein the body of said shock absorbing element is of a shape to conform to the annular space.

* * * * *

UNITED STATES PATENT AND TRADEMARK OFFICE
CERTIFICATE OF CORRECTION

PATENT NO. : 4,338,046
DATED : July 6, 1982
INVENTOR(S) : Clarence Thomerson

It is certified that error appears in the above-identified patent and that said Letters Patent are hereby corrected as shown below:

In column 6, line 11, change "of" to -- for --.

Signed and Sealed this

Twelfth Day of October 1982

[SEAL]

Attest:

GERALD J. MOSSINGHOFF

*Attesting Officer*   *Commissioner of Patents and Trademarks*